(12) United States Patent
Bohn

(10) Patent No.: US 8,035,615 B2
(45) Date of Patent: Oct. 11, 2011

(54) USER INPUT DEVICE WITH RING-SHAPED SCROLL WHEEL

(75) Inventor: David D. Bohn, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 999 days.

(21) Appl. No.: 11/938,798

(22) Filed: Nov. 13, 2007

(65) Prior Publication Data

US 2009/0122012 A1 May 14, 2009

(51) Int. Cl.
G09G 5/08 (2006.01)
(52) U.S. Cl. .......................... 345/163; 345/156; 200/564
(58) Field of Classification Search .......... 345/156–167, 345/184; 200/564
See application file for complete search history.

(56) References Cited

U.S. PATENT DOCUMENTS

| 5,095,303 | A | * | 3/1992 | Clark et al. ................. 345/164 |
|---|---|---|---|---|
| 5,874,940 | A | | 2/1999 | Rowe |
| 6,157,369 | A | * | 12/2000 | Merminod et al. ........... 345/157 |
| 6,188,393 | B1 | | 2/2001 | Shu |
| 6,344,643 | B1 | | 2/2002 | Chen |
| 6,525,714 | B1 | * | 2/2003 | Varga et al. ................. 345/164 |
| 6,724,365 | B1 | | 4/2004 | Escamilla et al. |
| 6,842,169 | B2 | | 1/2005 | Griffin et al. |
| 6,967,645 | B2 | * | 11/2005 | Wang ......................... 345/167 |
| 6,975,303 | B2 | | 12/2005 | Dalsey |
| 6,987,505 | B1 | | 1/2006 | Koo |
| 7,042,441 | B2 | * | 5/2006 | Adams et al. ................. 345/163 |
| 7,199,785 | B2 | * | 4/2007 | Ledbetter et al. ............. 345/156 |
| 7,205,977 | B2 | * | 4/2007 | Ledbetter et al. ............. 345/156 |
| 7,365,740 | B2 | * | 4/2008 | Chou ............................ 345/163 |
| 2001/0020932 | A1 | * | 9/2001 | Merminod et al. ........... 345/156 |
| 2002/0060663 | A1 | * | 5/2002 | Wang ............................ 345/156 |
| 2003/0006965 | A1 | * | 1/2003 | Bohn ............................ 345/163 |
| 2003/0107603 | A1 | * | 6/2003 | Clapper ........................ 345/784 |
| 2003/0169235 | A1 | * | 9/2003 | Gron et al. ................... 345/167 |
| 2003/0235329 | A1 | * | 12/2003 | Komatsuzaki et al. ....... 382/124 |
| 2004/0001045 | A1 | * | 1/2004 | Hu ................................ 345/163 |

(Continued)

FOREIGN PATENT DOCUMENTS

DE 4126042 A1 * 2/1993

(Continued)

OTHER PUBLICATIONS

Kissell, "The Evolution of Scrolling: Reinventing the Wheel", retrieved at <<http://db.tidbits.com/article/7925>>, pp. 4.

(Continued)

Primary Examiner — Amare Mengistu
Assistant Examiner — Dmitriy Bolotin
(74) Attorney, Agent, or Firm — Alleman Hall McCoy Russell & Tuttle LLP

(57) ABSTRACT

A user input device including a ring-shaped scroll wheel for use with a computing device is provided. The user input device includes a housing and a scroll wheel assembly coupled to the housing. The scroll wheel assembly includes a scroll wheel having a ring-shaped body and a scroll wheel support structure. The body of the scroll wheel may include a surface including an outer circumferential surface and an inner circumferential surface that bounds a hollow interior. The scroll wheel may be configured to extend through an opening of the housing. The scroll wheel support structure may include a frame and a plurality of supports mounted to the frame and contacting the surface of the scroll wheel. The plurality of supports may be configured to rotatably secure the scroll wheel to the scroll wheel support structure.

19 Claims, 4 Drawing Sheets

U.S. PATENT DOCUMENTS

| | | | |
|---|---|---|---|
| 2004/0008190 A1* | 1/2004 | Wang | 345/184 |
| 2004/0041790 A1* | 3/2004 | O'Keeffe et al. | 345/163 |
| 2005/0179660 A1* | 8/2005 | Ledbetter et al. | 345/163 |
| 2005/0264533 A1* | 12/2005 | Ledbetter et al. | 345/163 |
| 2006/0001657 A1 | 1/2006 | Monney et al. | |
| 2006/0007153 A1* | 1/2006 | Ledbetter et al. | 345/163 |
| 2006/0022944 A1 | 2/2006 | Pai | |
| 2006/0044257 A1* | 3/2006 | Chou | 345/156 |
| 2006/0192759 A1* | 8/2006 | Adams et al. | 345/163 |
| 2006/0212154 A1* | 9/2006 | Von Schroeter et al. | 700/118 |
| 2007/0057974 A1* | 3/2007 | Woodson | 345/684 |
| 2007/0139377 A1* | 6/2007 | Chiang et al. | 345/163 |
| 2007/0188453 A1* | 8/2007 | O'Sullivan | 345/163 |
| 2008/0168187 A1* | 7/2008 | Ranta et al. | 710/8 |
| 2008/0214166 A1* | 9/2008 | Ramer et al. | 455/414.3 |
| 2009/0079711 A1* | 3/2009 | Monney et al. | 345/184 |
| 2009/0096750 A1* | 4/2009 | Lee | 345/163 |

FOREIGN PATENT DOCUMENTS

JP     2008134716 A * 6/2008

OTHER PUBLICATIONS

"Short Takes: Kensington TurboRing Trackball", retrieved at <<http://www.vanshardware.com/reviews/2001/october/011002_TurboRing/011002_TurboR...>>, pp. 3.

* cited by examiner

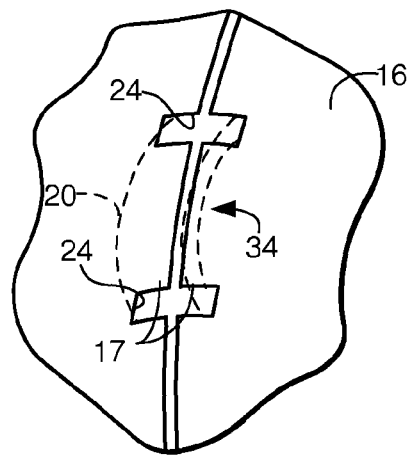
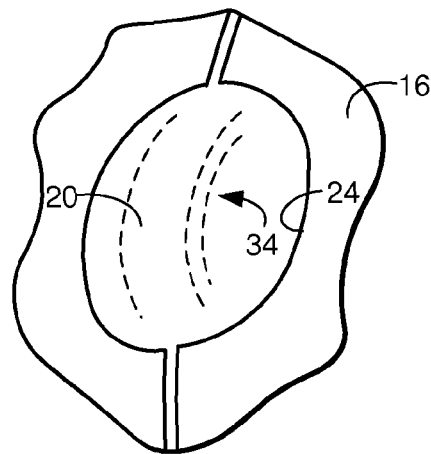
FIG. 5
Fig. 6
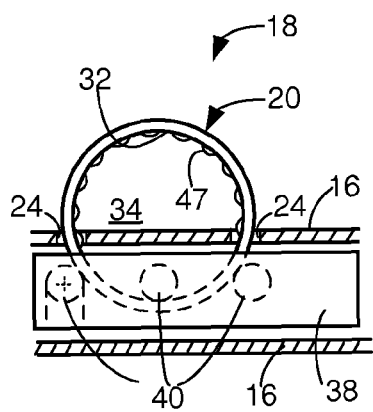
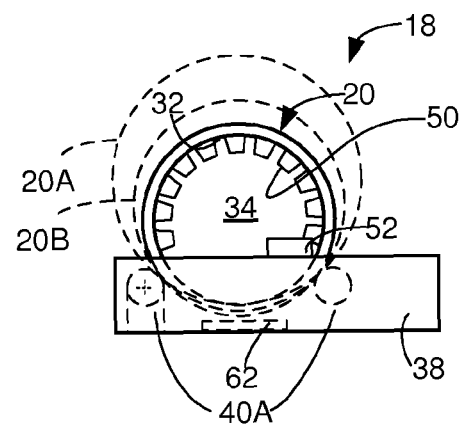
Fig. 7
Fig. 8
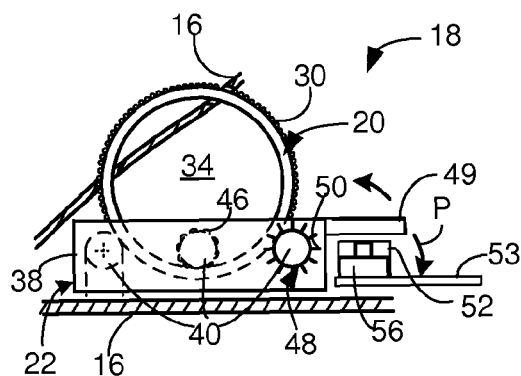
Fig. 9

USER INPUT DEVICE WITH RING-SHAPED SCROLL WHEEL

BACKGROUND

A scroll wheel may be provided on a computer mouse to enable the user to enter a scrolling input, which may be used in application programs, for example, to scroll through documents. Prior scroll wheels are generally solid circular wheels with a hub positioned at the center. These prior scroll wheels are rotatably mounted to a mouse body by an axle extending through a center hub of the scroll wheel. The center hub, axle, and associated support structure for the scroll wheel occupy valuable space inside the mouse, and their shape are accommodated by the mouse body, resulting in a relatively standardized appearance, including height profile, among many prior computer mouse designs.

SUMMARY

A user input device including a ring-shaped scroll wheel for use with a computing device is provided. The user input device includes a housing and a scroll wheel assembly coupled to the housing. The scroll wheel assembly includes a scroll wheel having a ring-shaped body and a scroll wheel support structure. The body of the scroll wheel may include a surface including an outer circumferential surface and an inner circumferential surface that bounds a hollow interior. The scroll wheel may be configured to extend through an opening of the housing. The scroll wheel support structure may include a frame and a plurality of supports mounted to the frame and contacting the surface of the scroll wheel. The plurality of supports may be configured to rotatably secure the scroll wheel to the scroll wheel support structure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a front detail view of the user input device of FIG. 1, showing two slots in the mouse body through which the ring-shaped scroll wheel passes.

FIG. 6 is a front detail view of another embodiment of a mouse body for the user input device of FIG. 1, showing one slot in the mouse body through which the ring scroll wheel passes.

FIG. 7 is a cutaway side view of an embodiment of a scroll wheel assembly suitable for use in the user input device of FIG. 1 or FIG. 10, with more than half of the ring scroll wheel extending above a housing of the user input device, and also with detents on an inner circumferential surface of the ring-shaped scroll wheel.

FIG. 8 is a cutaway side view of another embodiment of the scroll wheel assembly of the user input device of FIG. 1, with removable rings of various sizes held in place by a magnet.

FIG. 9 is a cutaway side view of another embodiment of the scroll wheel assembly of the user input device of FIG. 1, with a switch and detector positioned laterally adjacent a scroll wheel support structure, to enable a low profile.

DETAILED DESCRIPTION

Figure 10:
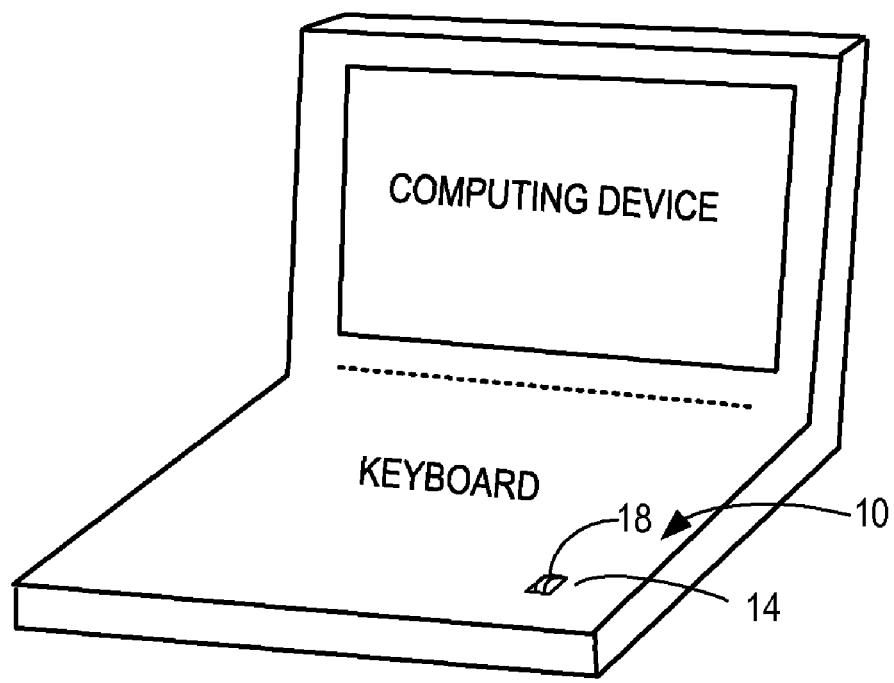
FIG. 10 illustrates another embodiment of a user input device with a scroll wheel assembly, in which the body of the user input device is incorporated into the housing of a computing device.
Figure 11:
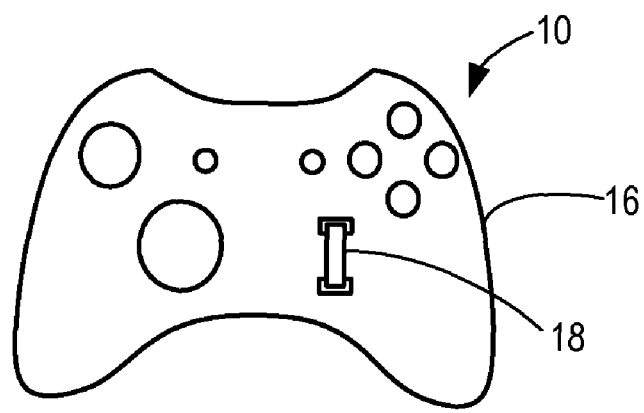
FIG. 11 illustrates another embodiment of a user input device with a scroll wheel assembly, in which the body of the user input device is incorporated into the housing of a game controller.

The Figures generally illustrate a user input device including a scroll wheel assembly having a ring-shaped scroll wheel without a center hub. FIGS. 1-6 illustrate a user input device in the form of a computer mouse, while FIG. 10 illustrates a user input device formed in a computing device, and FIG. 11 illustrates a user input device in the form of a game controller.

Figure 1:
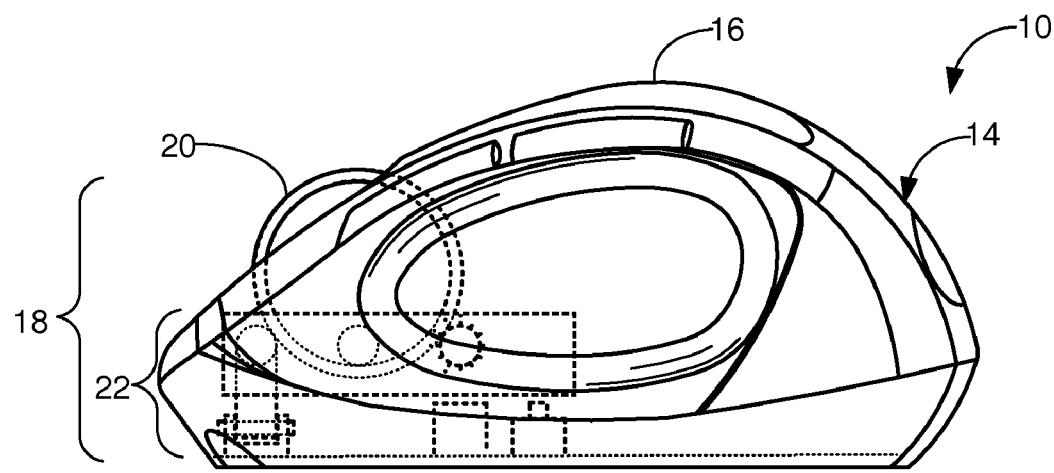
FIG. 1 is a side view of a user input device in the form of a computer mouse including a scroll wheel assembly having a ring-shaped scroll wheel without a center hub.

As shown in FIG. 1, user input device 10 may have a body 14 having an outer housing 16 formed in the shape of a computer mouse. A scroll wheel assembly 18 may be provided inside the user input device 10, and coupled to an inside wall of the outer housing 16. The scroll wheel assembly 18 may include a scroll wheel 20 formed in a ring shape, and a scroll wheel support structure 22 configured to rotatably support the scroll wheel.

Figure 3:
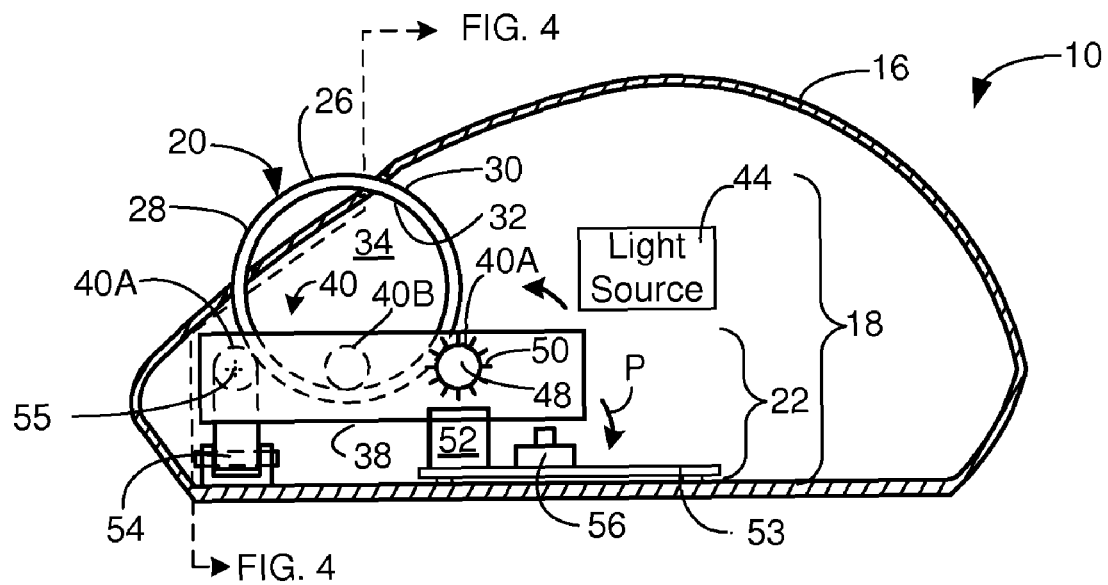
FIG. 3 is a side cross sectional view of the computer mouse of FIG. 1, taken along the line indicated in FIG. 2, illustrating internal details of the scroll wheel assembly.

As shown in FIG. 3, the scroll wheel 20 may include a ring-shaped body 26 having a surface 28 including an outer circumferential surface 30 and an inner circumferential surface 32 that bounds a hollow interior 34. The outer circumferential surface 30 may be configured to be contacted by a digit of a user.

Figure 2:
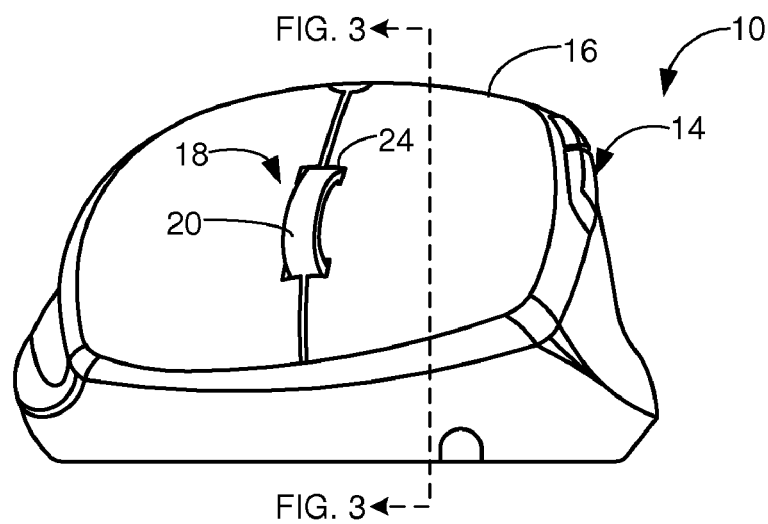
FIG. 2 is a front view of the computer mouse of FIG. 1.

As shown in FIG. 2, one or more openings 24 may be provided in the housing 16, and a portion of the scroll wheel 20 may be configured to extend through the openings 24 of the housing 16 of the computer mouse, thereby exposing the scroll wheel to an outside of the user input device for contact and manipulation by a digit of a user. As shown in detail in FIG. 5, a pair of openings 24 may be provided, and the housing 16 may include protrusions 17 that extend into the hollow interior 34 of the scroll wheel 20. Such a configuration may substantially separate an interior of the housing 16 from an exterior of the housing 16, and inhibit debris from falling into the interior of the housing 16 of the user input device 10, while still allowing unhindered scrolling movement of the scroll wheel 20.

Alternatively and as shown in FIG. 6, a single opening 24 may be provided, and the housing 16 may not extend into the hollow interior 34 of scroll wheel 20. It will be appreciated in some embodiments the scroll wheel 20 is configured to be removable from the scroll wheel support structure 22, as illustrated in FIG. 8. An opening 24 of the configuration shown in FIG. 6 may allow removal and replacement of such a scroll wheel 20.

The scroll wheel 20 may be made of various materials. For example, the scroll wheel 20 may be made of plastic, metal, and/or ceramic material, and may be magnetic, such as a ferrous metal. In one particular example, the scroll wheel 20 may be made entirely of plastic material. In another example, the scroll wheel may be made of a layer of plastic material overlaid with a layer of rubber material, the plastic material providing rigidity and the rubber material providing friction to inhibit slipping. In yet another example, the scroll wheel 20 may include a layer of metal material, such as stainless steel, overlaid with a layer of rubber material. In yet another example, the scroll wheel may be made entirely of a metal material.

The scroll wheel 20 may include an outer circumferential surface 30 that is textured to prevent slippage between the digit of the user and the surface of the scroll wheel 20 during scrolling. For example, a plurality of grooves or protrusions may be formed on the outer circumferential surface 30 to provide friction during scrolling, as shown in FIG. 9. In one embodiment, grooves may be formed in the outer circumferential surface 30 by knurling.

The scroll wheel 20 may be at least partially translucent, and may be manufactured, for example, from a translucent plastic material. As shown in FIG. 3, the scroll wheel assembly may further include a light source 44 configured to illuminate a transparent scroll wheel 20. The light source 44 may be a dedicated light source for scroll wheel illumination, such as a dedicated light emitting diode (LED). Alternatively, the light source 44 may be a guided light source that is configured to guide light from an existing light source in the user input device.

Continuing with FIG. 3, the scroll wheel support structure 22 may be configured to enable the scroll wheel 20 to smoothly rotate. For example, the scroll wheel support structure 22 may include a frame 38 and a plurality of scroll wheel supports 40 mounted to the frame 38 and contacting the surface 28 of the scroll wheel 20. The plurality of scroll wheel supports 40 are configured to rotatably secure the scroll wheel 20 to the frame 38 of the scroll wheel support structure 22.

One or more of the plurality of scroll wheel supports 40 may take the form of a roller configured to rotate as the scroll wheel 20 rotates. In the embodiment depicted in FIG. 3, the plurality of scroll wheel supports 40 includes three rollers: an inner roller 40B positioned on the inner circumferential surface 32 of the scroll wheel and two outer rollers 40A positioned on the outer circumferential surface 30 of the scroll wheel 30. The inner roller 40B may be configured to exert an outward (downward in FIG. 3) force on the scroll wheel 20, thereby securing the scroll wheel 20 to the scroll wheel support structure 22. The inner roller 40B may be mounted on a spring, to exert an outward (downward in FIG. 3) force on the scroll wheel 20. The outward force exerted by the inner roller 40B may be opposed by inward forces exerted by the outer rollers 40A.

The scroll wheel assembly 18 may further include an encoder and detector configured to encode and detect scrolling movement of the scroll wheel. The encoder may be an optical encoder wheel 48 having a plurality of encoder teeth 50, as shown in FIG. 3. The encoder wheel 48 may be mounted to an inner roller 40B or outer roller 40A that is configured to rotate with the scroll wheel 20. The scroll wheel assembly 18 may further include a detector 52 configured to read the encoder wheel 48. The detector 52 may be an optoelectric sensor configured to sense movement of the encoder wheel. The detector 52 may be mounted on a printed circuit board 53 configured with various electronic components of the user input device 10.

Alternatively and as shown in FIG. 8, the encoder wheel 48 may be mounted on the scroll wheel 20. For example, the scroll wheel 20 may be provided with a plurality of encoder teeth 50 on the inner circumferential surface 32 of the scroll wheel 20. The detector 52 may be mounted in a suitable position to read the encoder teeth 50 on the scroll wheel 20, as illustrated.

Continuing with FIG. 3, the scroll wheel assembly 18 may further include a pivot mechanism 54 having a pivot 55. The scroll wheel support structure 22 may be configured to pivot about the pivot 55 of the pivot mechanism 54, as indicated by arrows P, when the scroll wheel 20 is depressed by a digit of the user, to thereby actuate a pivot switch 56 of the user input device 10. The pivot mechanism 54 may be positioned near a front of the computer mouse.

Figure 4:
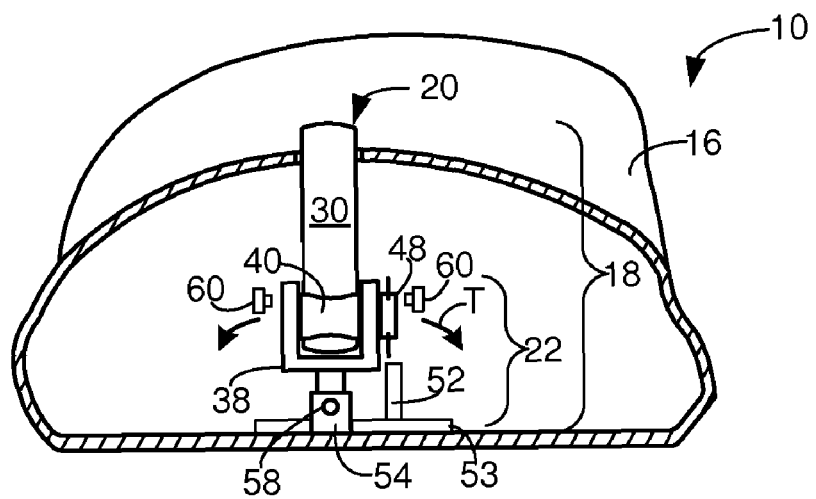
FIG. 4 is a front cutaway view, with a mouse body of the computer mouse cut away along the line in FIG. 3 to illustrate internal details of the scroll wheel assembly.

As shown in FIG. 4, the scroll wheel assembly 18 may further comprise a tilt mechanism 58 configured to enable the scroll wheel 20 to tilt laterally, as indicated by arrows T. For example, the tilt mechanism 58 may include an axle oriented along a longitudinal axis of the scroll wheel, onto which the scroll wheel assembly 18 is mounted. The scroll wheel assembly 18 may rotate side-to-side about the axle to produce tilting. The scroll wheel assembly 18 may further include one or more tilt switches 60 for sensing tilting of the scroll wheel.

FIG. 7 illustrates an embodiment for use in a low profile user input device, such as a low profile computer mouse, the computing device of FIG. 10, or the gaming controller of FIG. 11. In the embodiment of FIG. 7, over 50% of the scroll wheel 20 extends through the openings 24, allowing the user input device 10 to have a lower profile. It will be appreciated that the illustrated scroll wheel detents 47, discussed above, may be provided on any of the embodiments described herein.

FIG. 8 illustrates an embodiment in which the scroll wheel 20 is secured to the scroll wheel support structure 22 by a magnet 62. In this embodiment the plurality of scroll wheel supports 40 includes two or more outer rollers 40A that are positioned on the outside of the scroll wheel 20. Scroll wheel support structure 22 includes a magnet 62 placed on a bottom of the frame 38 to exert a magnetic pulling force on the scroll wheel 20, which is in this embodiment made of magnetic material, such as a ferrous metal. In this manner, the scroll wheel 20 is secured to the frame 38 of the scroll wheel support structure 22.

It will be appreciated that in embodiment of FIG. 8, the scroll wheel 20 may be one of a plurality of scroll wheels, as illustrated by scroll wheel 20, a second scroll wheel 20A, and a third scroll wheel 20B. The scroll wheel support structure 22 may be configured to removably secure each of the plurality of scroll wheels. A user may remove a scroll wheel through opening 24, such as illustrated in FIG. 6, by pulling on the scroll wheel sufficiently to overcome the force of magnet 62. It will be appreciated that each of the plurality of removable magnetic scroll wheels may have different characteristics, such as different diameter, thickness, width, color, weight, and/or texture.

FIG. 9 illustrates an embodiment in which one of the plurality of rollers includes roller detents 46 to provide indexed scrolling of the scroll wheel. Alternatively, the scroll wheel 20 may include scroll wheel detents 47 to provide indexed scrolling of the scroll wheel 20. For example and as shown in FIG. 7, the scroll wheel detents 47 may be provided on the inner circumferential surface 32 of the scroll wheel 20. Pivot switch 56 and detector 52 are positioned substantially level with the pivot support structure as viewed from the side, rather than below the pivot support structure. Pivot switch 56 is configured to be activated by tab 49 upon depression of the scroll wheel 20 by a digit of a user, thereby pivoting the frame 38 of scroll wheel support structure 22 as indicated by the arrows shown at P. Detector 52 is configured to sense the position of the scroll wheel 20 by reading teeth 50 of encoder wheel 48.

FIG. 10 illustrates another embodiment of user input device 10 with a scroll wheel assembly 18, in which the body 14 of the user input device 10 is incorporated into the housing of a computing device. While the computing device is illustrated as a laptop computing device, it will be appreciated that various other computing devices, such as a desktop computer, gaming device, automated teller machine, etc., may be utilized, as described below.

FIG. 11 illustrates another embodiment of user input device 10 with a scroll wheel assembly 18, in which the body 14 of the user input device 10 is incorporated into the housing of a game controller.

It will be appreciated that the above described configurations of a ring-shaped scroll wheel may enable the encoder and other mouse electronics to be positioned in a location other than below the scroll wheel support, such as above the scroll wheel support or laterally adjacent the scroll wheel support, as shown in FIG. 9. Such a positioning places the electronics further from an outer housing of the mouse, thereby inhibiting electrostatic discharge that can occur upon contact of the scroll wheel with a digit of the user. In addition, such a positioning may enable the user input device body to be formed with a low height profile. For example, the height of the user input device body may be only slightly larger than the scroll wheel, for example, 1.5 times the height of the scroll wheel. In some embodiments, such as shown in FIG. 7, the height of the user input device body may be less than the height of the scroll wheel. Further, since the scroll wheel of the present invention has no hub or center axle, and may be mounted by guides that couple to a bottom of the scroll wheel, it will be appreciated that in some embodiments the scroll wheel may extend outward from the mouse body to a greater extent than prior scroll wheels with central hubs and axles. For example, in some embodiments more than half of the scroll wheel may extend from the user input device body.

It will be appreciated that the user input devices described herein may be configured for use with computing device, such as a mainframe computer, personal computer, laptop computer, gaming device, automated teller machine, portable data assistant (PDA), computer-enabled wireless telephone, networked computing device, or other suitable computing device. These computing devices typically include a processor and associated volatile and non-volatile memory, and are configured to execute programs stored in non-volatile memory using portions of volatile memory and the processor.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A user input device for use with a computing device, the user input device including a housing and a scroll wheel assembly coupled to the housing, the scroll wheel assembly comprising:
    a scroll wheel including a ring-shaped body having a surface including an outer circumferential surface and an inner circumferential surface that bounds a hollow interior, the scroll wheel being configured to extend through an opening of the housing, the outer circumferential surface being configured to be contacted by a digit of a user; and
    a scroll wheel support structure including a frame and a plurality of supports mounted to the frame and contacting the surface of the scroll wheel, at least one of the plurality of supports positioned on the outer circumferential surface of the scroll wheel and configured to provide upward force on the scroll wheel, and at least one of the plurality of supports configured to provide downward force on the scroll wheel to rotatably secure the scroll wheel to the scroll wheel support structure.

2. The user input device of claim 1, wherein the housing extends into the hollow interior of the scroll wheel.

3. The user input device of claim 1, wherein the scroll wheel support structure is configured to enable the scroll wheel to smoothly rotate.

4. The user input device of claim 3, wherein the plurality of scroll wheel supports includes a plurality of rollers, at least one being positioned on the inner circumferential surface of the scroll wheel.

5. The user input device of claim 1, wherein the plurality of scroll wheel supports includes an inner roller positioned on the inner circumferential surface of the scroll wheel and two outer rollers positioned on the outer circumferential surface of the scroll wheel.

6. The user input device of claim 4, wherein one of the plurality of rollers includes detents to provide indexed scrolling.

7. The user input device of claim 4, wherein the scroll wheel assembly further includes an encoder wheel, the encoder wheel being configured to encode scrolling movement of the scroll wheel.

8. The user input device of claim 7, wherein the encoder wheel is mounted to one of the plurality of rollers.

9. The user input device of claim 8, wherein the scroll wheel assembly further includes a sensor configured to read the encoder wheel.

10. The user input device of claim 1, wherein the scroll wheel is provided with a plurality of encoder teeth on the inner circumferential surface of the scroll wheel.

11. The user input device of claim 1, wherein the scroll wheel assembly further includes a pivot mechanism, and the scroll wheel support structure is configured to pivot about a pivot of the pivot mechanism when the scroll wheel is depressed by a digit of the user, to thereby actuate a pivot switch.

12. The user input device of claim 1, the scroll wheel assembly further comprising a tilt mechanism configured to enable the scroll wheel to tilt laterally.

13. The user input device of claim 1, wherein the scroll wheel is one of a plurality of scroll wheels, the scroll wheel support structure is configured to removably secure each of the plurality of scroll wheels.

14. The user input device of claim 1, wherein the scroll wheel assembly further includes a magnet configured to magnetically secure the scroll wheel to the scroll wheel assembly, allowing the scroll wheel to be removable from the scroll wheel assembly.

15. The user input device of claim 1, wherein the scroll wheel is translucent and the scroll wheel assembly further comprises a light source configured to illuminate the scroll wheel.

16. The user input device of claim 1, wherein the housing is in a shape of a computer mouse or gaming controller.

17. The user input device of claim 1, wherein the housing is in a shape of a computing device.

18. A user input device for use with a computing device, the user input device comprising a scroll wheel assembly, the scroll wheel assembly including:
    a plurality of scroll wheels, each scroll wheel having a ring-shaped body with no center hub, each of the ring-shaped bodies having a surface including an outer circumferential surface configured to be contacted by a digit of a user and an inner circumferential surface that bounds a hollow interior;

a scroll wheel support structure including a frame;

a plurality of scroll wheel supports mounted to the frame and contacting the surface of the scroll wheel, the plurality of scroll wheel supports including two rollers positioned on the outer circumferential surface of the scroll wheel and configured to rotatably secure the scroll wheel to the frame; and a magnet configured to magnetically secure the scroll wheel to the scroll wheel assembly, allowing each of the plurality of scroll wheels to be removably secured to the scroll wheel assembly.

19. A user input device for use with a computing device, comprising:

a housing;

a scroll wheel having a ring-shaped body with an outer circumferential surface configured to be contacted by a digit of a user and an inner circumferential surface that bounds a hollow interior;

a scroll wheel support structure configured to couple the scroll wheel to the housing, the scroll wheel support structure comprising a frame and a plurality of supports mounted to the frame and contacting the surface of the scroll wheel, at least one of the plurality of supports positioned on the outer circumferential surface of the scroll wheel and configured to provide upward force on the scroll wheel, and at least one of the plurality of supports configured to provide downward force on the scroll wheel to rotatably secure the scroll wheel to the scroll wheel support structure;

wherein the scroll wheel is at least partially translucent and is configured to be illuminated by a light source.

* * * * *